United States Patent
Fought et al.

(10) Patent No.: US 7,924,829 B2
(45) Date of Patent: Apr. 12, 2011

(54) TECHNIQUE FOR ENABLING NETWORK STATISTICS ON SOFTWARE PARTITIONS

(75) Inventors: Kevin Lynn Fought, Round Rock, TX (US); Vinit Jain, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/742,073

(22) Filed: Apr. 30, 2007

(65) Prior Publication Data

US 2008/0267193 A1  Oct. 30, 2008

(51) Int. Cl.
    *H04L 12/28* (2006.01)
(52) U.S. Cl. ........ 370/389; 370/473; 370/474; 370/392; 709/310; 709/330; 709/331
(58) Field of Classification Search ............. 370/395.31, 370/395.32, 395.52, 254, 255, 392, 428, 370/401; 709/223, 224, 226, 215, 218, 221, 709/250; 711/153, 200, 201, 203, 205, 9, 711/10
See application file for complete search history.

(56) References Cited

U.S. PATENT DOCUMENTS

| | | | | |
|---|---|---|---|---|
| 2002/0002615 | A1* | 1/2002 | Bhagavath et al. | 709/227 |
| 2003/0145122 | A1* | 7/2003 | Banerjee et al. | 709/250 |
| 2004/0202185 | A1* | 10/2004 | Ratcliff et al. | 370/395.53 |
| 2004/0205253 | A1* | 10/2004 | Arndt et al. | 710/1 |
| 2005/0021287 | A1* | 1/2005 | Rjaibi | 702/180 |
| 2005/0076178 | A1* | 4/2005 | Coppock et al. | 711/114 |
| 2005/0210098 | A1* | 9/2005 | Nakamichi et al. | 709/203 |
| 2005/0232279 | A1 | 10/2005 | Brown et al. | |
| 2006/0206662 | A1* | 9/2006 | Ludwig et al. | 711/114 |
| 2007/0220203 | A1* | 9/2007 | Murase | 711/114 |

OTHER PUBLICATIONS

U.S. Appl. No. 11/397,845, filed Apr. 4, 2006, Jain et al.
"FreeBSD: Network Stack Virtualization", http://kerneltrap.org/node/467, submitted Oct. 17, 2002, pp. 1-5.
Liu, "Utility Tools for Management of Solaris™ Containers", Sun Microsystems, Sep. 2005, pp. 1-29.

* cited by examiner

*Primary Examiner* — Pankaj Kumar
*Assistant Examiner* — Anez Ebrahim
(74) *Attorney, Agent, or Firm* — Matthew W. Baca; Amy J. Pattillo

(57) ABSTRACT

A computer implemented method, data processing system, and computer program product for enabling network statistics to be collected per software partition. When an incoming data packet is received at the Internet Protocol (IP) layer of an operating system, the IP address in the incoming data packet is identified. The IP address in the incoming data packet is then compared against IP addresses stored in a hash table, wherein the hash table maps each IP address in the hash table to a software partition of the operating system. If an IP address in the hash table matches the IP address in the data packet, the software partition mapped to the located IP address in the hash table is identified. Network statistics collected for the incoming data packet are then associated with the software partition.

15 Claims, 3 Drawing Sheets

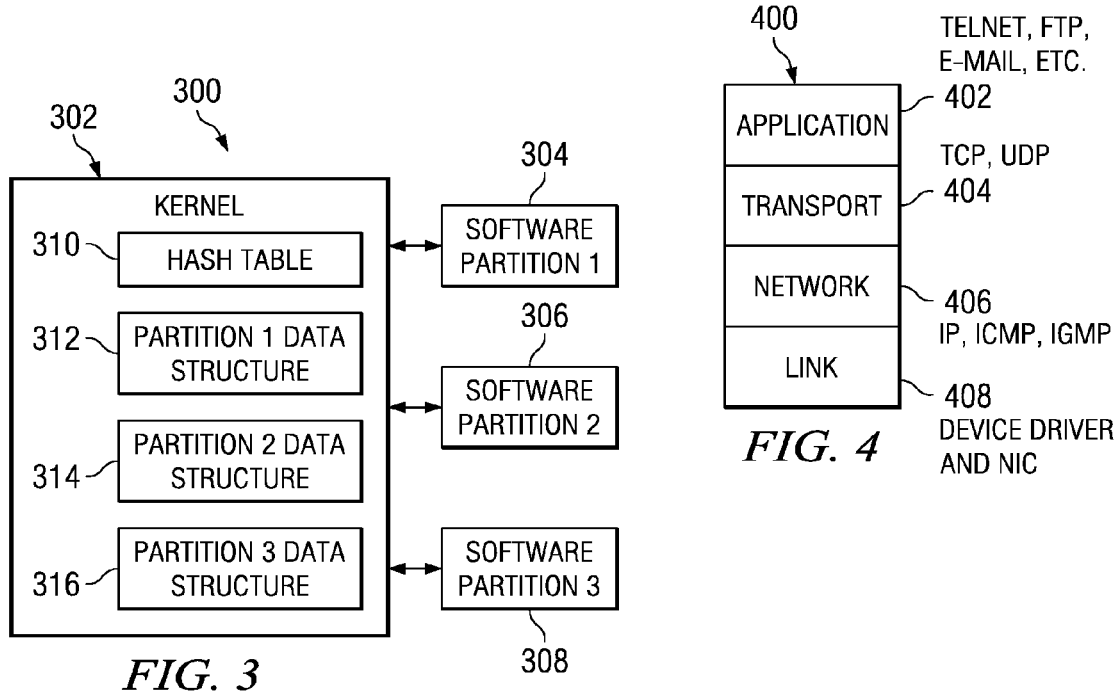
FIG. 3
FIG. 4
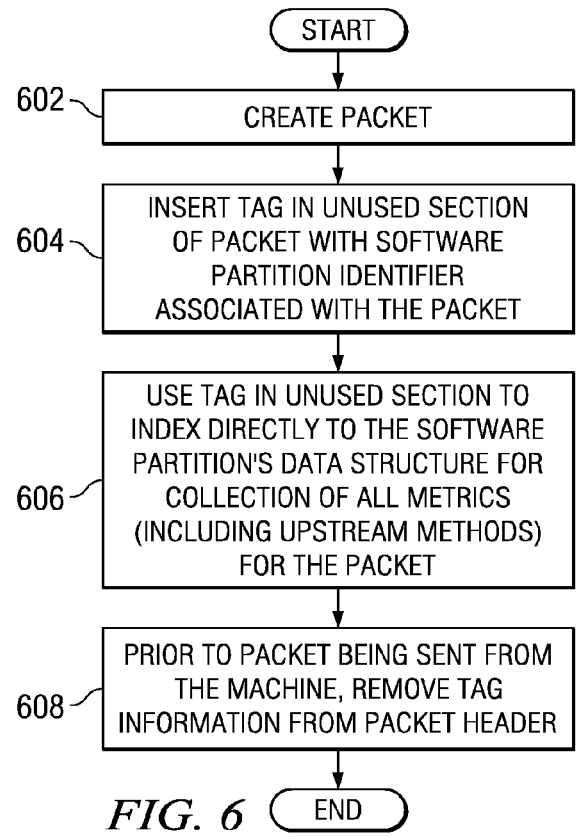
FIG. 6

TECHNIQUE FOR ENABLING NETWORK STATISTICS ON SOFTWARE PARTITIONS

BACKGROUND OF THE INVENTION

1. Field of the Invention

The present invention relates generally to an improved data processing system, and in particular to a computer implemented method, data processing system, and computer program product for enabling network statistics to be collected per software partition.

2. Description of the Related Art

In an Internet Protocol (IP) network, a message passing mechanism is used to send packets of data between a host machine, such as a server computer on the Internet commonly referred to as a web server, and a client machine, such as user's computer connected to the Internet. The message passing mechanism consists of a transport protocol, an upper level protocol, and an application programming interface. The key standard transport protocols used on IP networks today are the Transmission Control Protocol (TCP) and the User Datagram Protocol (UDP).

When a network packet is received by an operating system on the host or client machine, the operating system kernel may begin to collect statistics from the packet about the performance of the system. A system's network performance is a common gauge users will look at to determine how the system is operating. Software partitions are used in some systems to provide an isolated environment within one operating system instance. However, in systems which currently employ software partitioning, network statistics that are collected reflect performance information about the overall system. In other words, existing systems which employ software partitioning only allow network performance information to be collected about the overall system, rather than collected for the individual software partitions. This limitation is due to the fact that software partitions share the same network devices with other software partitions and the general system in which they run.

SUMMARY OF THE INVENTION

The illustrative embodiments provide a computer implemented method, data processing system, and computer program product for enabling network statistics to be collected per software partition. When an incoming data packet is received at the Internet Protocol (IP) layer of an operating system, the IP address in the incoming data packet is identified. The IP address in the incoming data packet is then compared against IP addresses stored in a hash table, wherein the hash table maps each IP address in the hash table to a software partition of the operating system. If an IP address in the hash table matches the IP address in the data packet, the software partition mapped to the located IP address in the hash table is identified. Network statistics collected for the incoming data packet are then associated with the software partition.

BRIEF DESCRIPTION OF THE DRAWINGS

The novel features believed to be characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates components in a data processing system used for collecting metrics about software partitions in accordance with the illustrative embodiments;

FIG. 4 is a diagram of a transmission control protocol/Internet protocol (TCP/IP) and similar protocols in accordance with the illustrative embodiments;

FIG. 6 is a flowchart of a process using an outbound data packet for enabling network statistics to be gathered per software partition in accordance with the illustrative embodiments.

DETAILED DESCRIPTION OF THE PREFERRED EMBODIMENT

Figure 1:
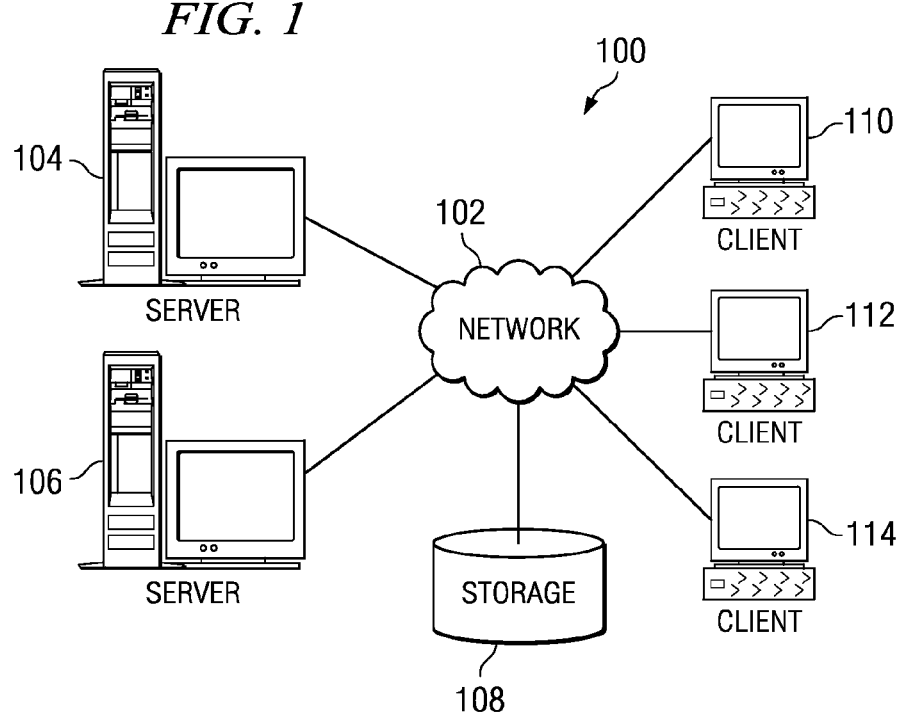
FIG. 1 depicts a pictorial representation of a distributed data processing system in which the illustrative embodiments may be implemented.
Figure 2:
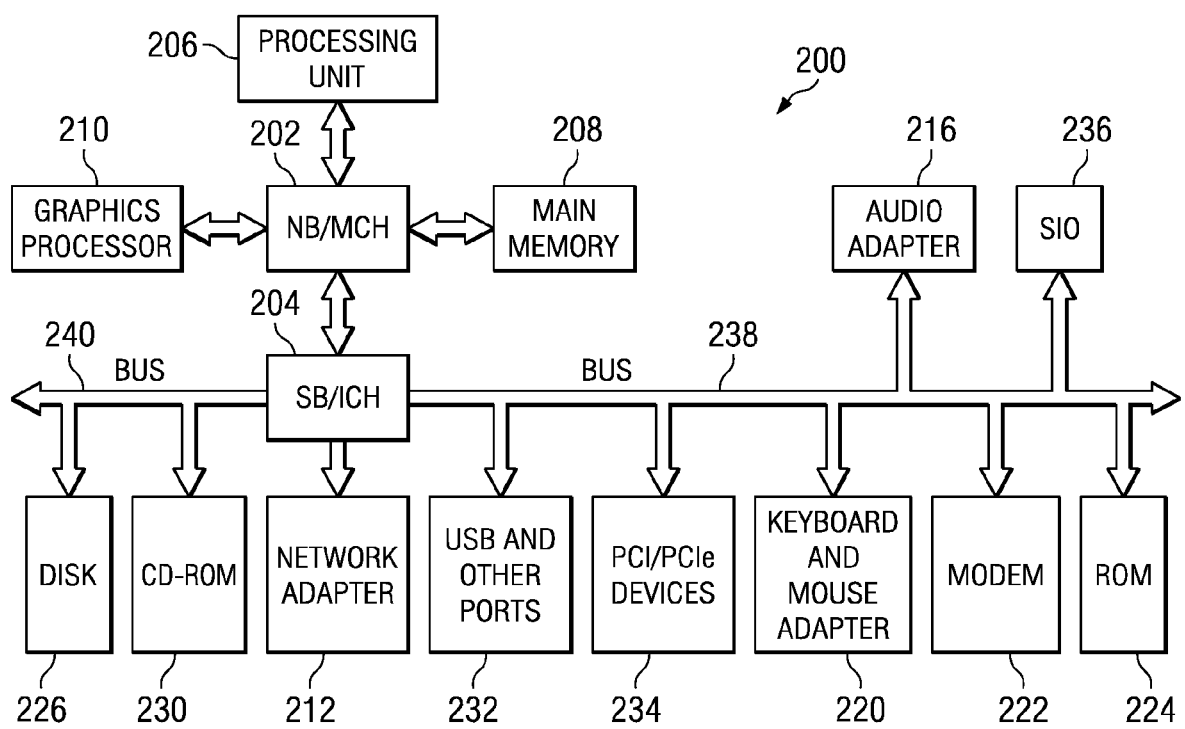
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary, and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system, and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In currently used systems, network statistics may be collected to determine how the system is operating. However, these network statistics are collected for the overall system rather than at the software partition level. Currently used systems cannot provide individualized network information since the software partitions share the same network devices with other software partitions and the general system in which they run. The illustrative embodiments provide a solution to the limitations in the currently used systems by providing a mechanism which enables network metrics to be gathered within the kernel to allow network statistics to be reported per software partition. With the illustrative embodiments, network metrics for individual software partitions may be collected by breaking down an incoming network packet at the IP layer of the operating system and comparing the IP address in the incoming network packet to known software partitions.

In particular, the illustrative embodiments create a hash table to map IP addresses to software partitions for this environment. Each time an IP address is created for a software partition, the IP address-to-software partition mapping is added to the hash table. When a data packet arrives at the IP layer of the operating system, as part of the normal processing of the packet, the packet is broken apart to determine the IP address of the packet. The illustrative embodiments then compare the IP address of the packet with the IP addresses stored in the hash table. If a match is located in the hash table, all metrics normally collected for the packet may be labeled as belonging to the software partition mapped to the matching IP address in the hash table.

In addition, the packet may also be tagged in an unused section of the packet to identify the packet to all upstream methods as belonging to the particular software partition. Furthermore, since inbound interface metrics have already been collected for this packet, the inbound interface metrics for this software partition may be retrofitted at this point by associating previously collected network metrics with the software partition identified in the IP layer.

Outbound packets may also be easily tagged in the same unused section of the network packet while still in the process space of the software partition. Thus, all outbound metrics may be quickly correlated to the software partition to which they belong, and network metrics may be collected through the entire outbound route per software partition.

FIG. 3 illustrates components in a data processing system which are used for collecting metrics about software partitions in accordance with the illustrative embodiments. Data processing system 300 comprises operating system kernel 302 which may create a plurality of partitionable machines (e.g., software partition 1 304, 2 306, and 3 308). To a user, each software partition within the operating system appears to be running within its own system. Within kernel 302, partitions are indexed by a number. Thus, each time a software partition is created by kernel 302, kernel 302 may assign a unique identifier to the partition (e.g., 1, 2, 3, etc.)

Kernel 302 may collect statistics about the performance of the network. To enable the collection of network statistics per software partition, kernel 302 employs hash table 310 and data system structures which correspond to software partition 1 304, 2 306, and 3 308, such as partition 1 data structure 312, partition 2 data structure 314, and partition 3 data structure 316. In this illustrative example, hash table 310, partition 1 data structure 312, partition 2 data structure 314, and partition 3 data structure 316 are located within kernel 302, although it should be noted that these components may be located at any suitable location within the data processing system. Each time an IP address is created for a partition, hash table 310 is updated with a mapping which indicates the association between the new IP address and the partition. The mapping identifying a packet as belonging to a particular software partition may then be used to tag the packet in an unused section of the packet header with the unique identifier of the associated software partition.

The unique partition identifier placed in the packet header may then be used to associate all network metrics normally taken for the packet with the particular software partition. Kernel 302 uses each data system structure to store the network statistics collected for the packet for each software partition. For example, partition 1 data structure 312 stores statistics collected for software partition 1 304, etc.

FIG. 4 is a diagram of a transmission control protocol/Internet protocol (TCP/IP) and similar protocols and is depicted in accordance with an illustrative embodiment of the present invention. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet Protocol (IP), Internet control message protocol (ICMP), and Internet group management protocol (IGMP).

When a packet is received at network layer 406, as part of normal processing, the packet is taken apart in order to determine the IP address in the packet. Once the IP address of the packet is known, the kernel may then access hash table 310 in FIG. 3 to determine the software partition associated with the IP address. Prior to this point in network layer 406, the software partition associated with the packet is unknown. Thus, any network metrics collected at the previous link layer 408 will not be stored in a particular partition data structure, since at link layer 408 the kernel does not know to which software partition the incoming packet belongs.

When the kernel determines from the hash table which software partition is associated with the IP address, the metrics collected at network layer 406 may be provided to the partition data structure corresponding to the software partition associated with the packet. Thus, rather than providing all collected network metrics to a data structure for the overall system, the metrics may be segregated out into separate partition data structures based on the IP address-to-particular software partition mapping in the hash table.

In addition, at network layer 406, an unused section of the packet header is tagged with the software partition identified in the hash table. The value tagged in the unused section of the packet header is the software partition identifier. Consequently, the remaining layers of code through which the packet traverses (e.g., transport layer 404, application layer 402, etc.) may collect additional metrics and use the value tagged in the unused section of the packet header to index those metrics directly to the identified software partition's data structure. Thus, the upstream layers of code do not need to lookup the software partition identifier in the hash table to determine to which partition the network metrics collected for the packet belong.

As previously mentioned, network metrics collected at link layer 408 are not indexed into a particular partition data structure since the kernel does not know at that time to which software partition the incoming packet belongs. At network layer 406, the kernel may now update the metrics previously collected at link layer 408 to indicate that these metrics collected for the packet also belong to the identified software partition.

Transport layer 404 provides an interface between network layer 406 and application layer 402 that facilitates the transfer of data between two host computers. Transport layer 404 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present: TCP and user datagram protocol (UDP). TCP provides reliability services to ensure that data is properly transmitted between two hosts, including dropout detection and retransmission services.

TCP segmentation and TCP checksum are used as an exemplary implementation of embodiments of the present invention and in no way limits segmentation offload and checksum offload to the TCP suite of protocols. In other embodiments, segmentation offloading and checksum offloading may be used with any transport protocol, for example, user datagram protocol and other versions of TCP protocol.

Conversely, user datagram protocol provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login, a file transfer protocol (FTP), a simple mail transfer protocol (SMTP) for electronic mail, and a simple network management protocol (SNMP).

Figure 5:
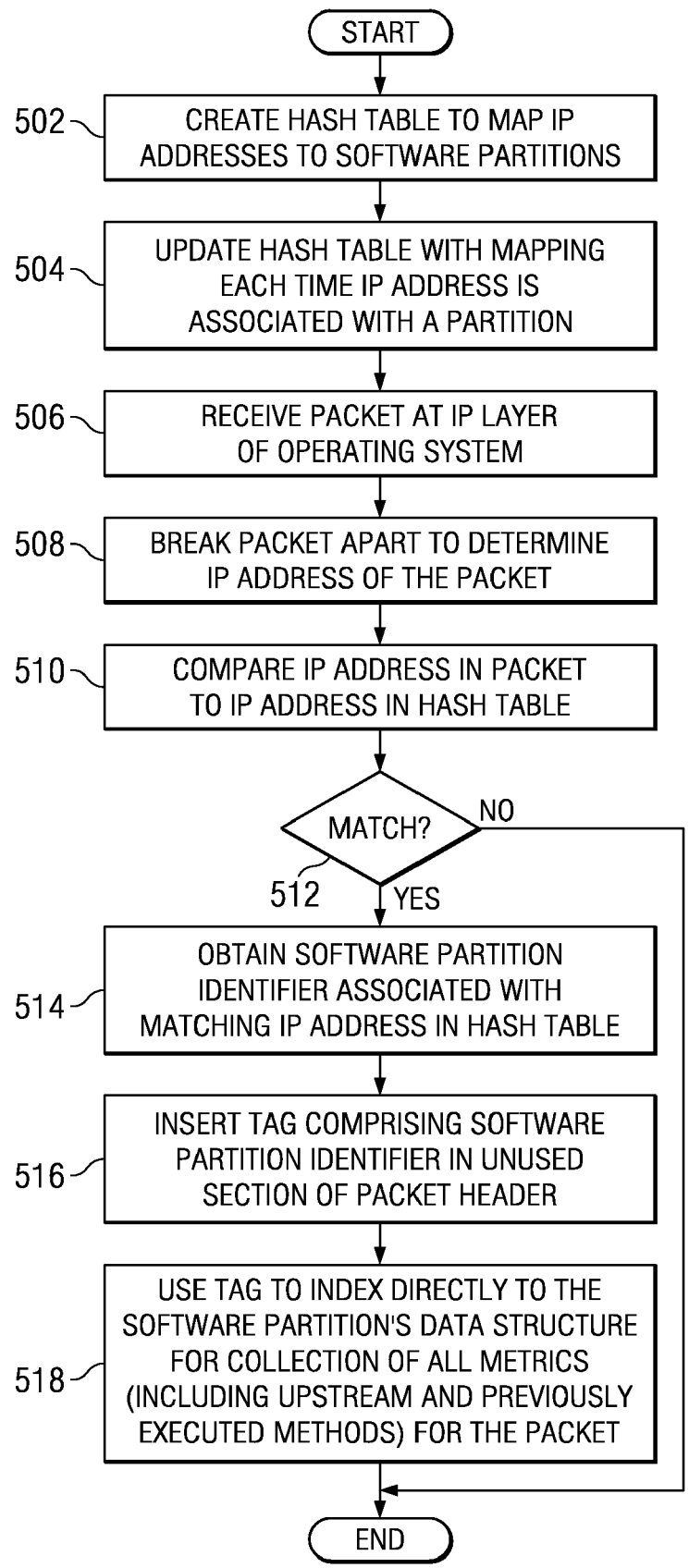
FIG. 5 is a flowchart of a process for enabling network statistics to be gathered per software partition in accordance with the illustrative embodiments.

FIG. 5 is a flowchart of a process using an inbound data packet for enabling network statistics to be gathered per software partition in accordance with the illustrative embodiments. The process described in FIG. 5 may be implemented in a data processing system, such as data processing system 300 in FIG. 3. The process begins with the creation of a hash table for storing mappings between IP addresses and the software partitions to which the addresses belong (step 502). Each time an IP address is created and associated with a software partition, the hash table is updated with the IP address-to-software partition mapping (step 504).

When a data packet arrives at the IP layer of the operating system (step 506), as part of the normal processing of the packet, the packet is broken apart to determine the IP address of the packet (step 508). Once the IP address of the packet is known, the kernel compares the IP address of the packet against the IP addresses stored in the hash table (step 510). A determination is then made as to whether the comparison results in an IP address match (step 512). If no match exists in the hash table ('no' output of step 512), the processing of the packet terminates thereafter. However, if a match is found in the hash table ('yes' output of step 512), all metrics normally gathered for the packet at the IP layer may be labeled as belonging to a particular software partition associated with the matching IP address in the hash table or stored within a software partition data structure corresponding to the identified software partition (step 514).

Next, a tag comprising the software partition identifier may be inserted into an unused section of the header of the packet (step 516). As the packet travels upstream through the layers of code, the kernel may use the tag in the unused section to index directly to the software partition's data structure for collection of all metrics for the packet, including all upstream and previously executed methods (step 518). For instance, when the layers of code following the IP layer collect additional metrics for the packet, these layers may look at the tag to index directly to the data structure of the partition for metric collection, without having to perform the lookup in the hash table. Additionally, since inbound interface metrics were already collected for this packet prior to the IP layer, the inbound interface metrics for the software partition may get retrofitted by associating the previously collected metrics with the software partition identified in the IP layer. In this manner, all metrics collected for the packet may be identified as belonging to a particular software partition, and may be labeled as such or placed in the data structure corresponding to the software partition to allow one to review the performance of the network based on the performance of each partition in the system.

FIG. 6 is a flowchart of a process using an outbound data packet for enabling network statistics to be gathered per software partition in accordance with the illustrative embodiments. Outbound packets may also be easily tagged in the same unused section of the network packet described in FIG. 5 while still in the process space of the software partition. Thus, all outbound metrics may be quickly correlated to the software partition to which they belong, and metrics may be collected through the entire outbound route. The process described in FIG. 6 may be implemented in a data processing system, such as data processing system 300 in FIG. 3.

The process begins when an outbound data packet is created (step 602). A tag comprising a value identifying the software partition associated with the packet is inserted into an unused section of packet header (step 604), as the software partition with which the packet is associated is known. Thus, no hash table lookup is necessary when tagging an outbound packet. As the packets go through the many layers to when it leaves the machine, the unused field is checked to obtain statistics.

As the kernel collected metrics for the outbound packet traversing through the layers of code before leaving the machine, the kernel checks the tag in order to index directly to the data structure of the software partition for the collection of the network metrics for the packet (step 606). Prior to the outbound packet being sent from the machine, the software partition information in the tagged section is removed from the packet header (step 608).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, or semiconductor system (or apparatus or device). Examples of a computer-readable medium include a semiconductor or solid state memory, magnetic tape, a removable computer diskette, a random access memory (RAM), a read-only memory (ROM), and a rigid magnetic disk.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for enabling network statistics to be collected per software partition, the computer implemented method comprising:

responsive to receiving an incoming data packet at an Internet Protocol layer of an operating system, identifying, using a processor, an Internet Protocol address in the incoming data packet;

comparing the Internet Protocol address in the incoming data packet against Internet Protocol addresses stored in a hash table, wherein the hash table maps each Internet Protocol address in the hash table to a software partition of the operating system, wherein the operating system comprises a separate software partition data structure corresponding to each software partition from among a plurality of software partitions;

responsive to locating an Internet Protocol address in the hash table that matches the Internet Protocol address in the data packet, identifying the software partition mapped to the located Internet Protocol address from among the plurality of software partitions;

responsive to identifying the software partition mapped to the located Internet Protocol address, inserting a tag comprising the identifier of the software partition in an unused section of the network packet header for the incoming data packet at the Internet Protocol layer of a protocol stack;

using the tag to indicate to all upstream methods at the transport layer and application layer of the protocol stack that the incoming data packet belongs to the software partition; and associating network statistics collected for the incoming data packet at the Internet Protocol layer with the software partition in the particular software partition data structure associated with the software partition.

2. The computer implemented method of claim 1, further comprising:
assigning an identifier to each software partition, wherein the hash table maps each Internet Protocol address in the hash table to the identifier of a software partition.

3. The computer implemented method of claim 2, further comprising:
responsive to creating a new Internet Protocol address, updating the hash table with a mapping of the new Internet Protocol address and the identifier assigned to the software partition in which the new Internet Protocol address was created.

4. The computer implemented method of claim 1, wherein the upstream methods within at least one of the transport layer and the application layer identify the software partition associated with the incoming data packet and associate collected network statistics to the software partition in the particular software partition data structure.

5. The computer implemented method of claim 4, wherein associating collected network statistics with the particular software partition data structure includes indexing the collected network statistics for the incoming data packet directly the particular software partition data structure maintained within the operating system separate from the software partition.

6. The computer implemented method of claim 1, further comprising:
responsive to identifying the software partition mapped to the located Internet Protocol address at the Internet Protocol layer, associating previously collected network statistics, collected by the operating system from the link layer of the protocol layer stack for the incoming data packet, with the software partition in the particular software partition data structure associated with the software partition, wherein the incoming data packet passes through the link layer prior to reaching the Internet Protocol layer within the protocol layer stack.

7. The computer implemented method of claim 1, wherein identifying an Internet Protocol address includes breaking apart the incoming data packet to locate the Internet Protocol address in a header of the incoming data packet.

8. A computer implemented method for enabling network statistics to be collected per software partition, the computer implemented method comprising:
creating, using a processor, an outbound data packet;
inserting a tag comprising an identifier of a software partition associated with the outbound data packet by an operating system in an unused section of a network packet header for the outbound data packet;
responsive to collecting network statistics for the outbound data packet by the operating system as the outbound data packet traverses a plurality of layers of a protocol stack, using the tag to identify the software partition associated with the outbound data packet and associate the collected network statistics with the software partition in a particular software partition data structure of the operating system corresponding to the software partition from among a plurality of software partition data structures; and
removing the tag, by the operating system, from the network packet header prior to sending the outbound data packet to a network.

9. A computer program product for enabling network statistics to be collected per software partition, the computer program product comprising:
a non-transitory computer usable medium having computer usable program code tangibly embodied thereon, the computer usable program code comprising: computer usable program code for identifying, in response to receiving an incoming data packet at an Internet Protocol layer of an operating system, an Internet Protocol address in the incoming data packet; computer usable program code for comparing the Internet Protocol address in the incoming data packet against Internet Protocol addresses stored in a hash table, wherein the hash table maps each Internet Protocol address in the hash table to a software partition of the operating system, wherein the operating system comprises a separate software partition data structure corresponding to each software partition from among a plurality of software partitions;
computer usable program code for identifying, in response to locating an Internet Protocol address in the hash table that matches the Internet Protocol address in the data packet, the software partition mapped to the located Internet Protocol address from among the plurality of software partitions; and
computer usable program code for inserting a tag comprising the identifier of the software partition in an unused section of the network packet header for the incoming data packet in response to identifying the software partition mapped to the located Internet Protocol address at the Internet Protocol layer of a protocol stack; computer usable program code for using the tag to indicate to all upstream methods at the transport layer and application layer of the protocol stack that the incoming data packet belongs to the software partition; and
computer usable program code for associating network statistics collected for the incoming data packet with the software partition in the particular software partition data structure associated with the software partition.

10. The computer program product of claim 9, further comprising:
computer usable program code for assigning an identifier to each software partition, wherein the hash table maps each Internet Protocol address in the hash table to the identifier of a software partition.

11. The computer program product of claim 10, further comprising:
computer usable program code for updating, in response to creating a new Internet Protocol address, the hash table with a mapping of the new Internet Protocol address and the identifier assigned to the software partition in which the new Internet Protocol address was created.

12. The computer program product of claim 9, wherein the upstream methods within at least one of the transport layer and the application layer identify the software partition associated with the incoming data packet and associate collected network statistics to the software partition in the particular software partition data structure.

13. The computer program product of claim 12, wherein associating collected network statistics with the particular software partition data structure includes indexing the collected network statistics for the incoming data packet directly the particular software partition data structure maintained within the operating system separate from the software partition.

14. The computer program product of claim 9, further comprising:
   computer usable program code for associating previously collected network statistics, collected by the operating system from the link layer of the protocol layer stack for the incoming data packet, with the software partition in the particular software partition data structure associated with the software partition, wherein the incoming data packet passes through the link layer prior to reaching the Internet Protocol layer within the protocol layer stack, in response to identifying the software partition mapped to the located Internet Protocol address.

15. The computer program product of claim 9, wherein the computer usable program code for identifying an Internet Protocol address includes computer usable program code for breaking apart the incoming data packet to locate the Internet Protocol address in a header of the incoming data packet.

* * * * *